(12) United States Patent
Danley et al.

(10) Patent No.: US 8,109,679 B2
(45) Date of Patent: Feb. 7, 2012

(54) OPTICAL FERRULE ASSEMBLIES AND METHODS OF MAKING THE SAME

(75) Inventors: Jeffrey D. Danley, Hickory, NC (US); Christopher P. Lewallen, Hudson, NC (US); James P. Luther, Hickory, NC (US); Joel C. Rosson, Hickory, NC (US); David A. Thompson, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 95 days.

(21) Appl. No.: 12/339,238

(22) Filed: Dec. 19, 2008

(65) Prior Publication Data

US 2010/0129031 A1  May 27, 2010

Related U.S. Application Data

(60) Provisional application No. 61/117,941, filed on Nov. 25, 2008.

(51) Int. Cl.
G02B 6/36 (2006.01)
(52) U.S. Cl. ............................................ 385/85; 385/71
(58) Field of Classification Search ............. 385/71, 385/78–80, 85; 252/79.1
See application file for complete search history.

(56) References Cited

U.S. PATENT DOCUMENTS

| | | | | |
|---|---|---|---|---|
| 4,907,017 A | * | 3/1990 | Azuma ........................ | 347/242 |
| 5,214,730 A | | 5/1993 | Nagasawa et al. ............. | 385/59 |
| 5,283,850 A | * | 2/1994 | Souloumiac .................... | 385/84 |
| 5,743,785 A | | 4/1998 | Lundberg et al. .............. | 451/28 |
| 5,867,621 A | | 2/1999 | Luther et al. .................... | 385/59 |
| 6,089,759 A | | 7/2000 | Kawamura et al. ............. | 385/78 |
| 6,312,164 B1 | | 11/2001 | Kawamura et al. ............. | 385/78 |
| 6,350,062 B2 | | 2/2002 | Knecht et al. .................... | 385/84 |
| 6,499,887 B2 | | 12/2002 | Dean, Jr. et al. ................ | 385/78 |
| 6,547,449 B1 | | 4/2003 | Dean, Jr. et al. ................ | 385/78 |
| 6,705,767 B1 | | 3/2004 | Dean, Jr. et al. ................ | 385/85 |
| 6,769,811 B2 | | 8/2004 | Hall et al. ........................ | 385/59 |
| 6,786,650 B2 | | 9/2004 | Dean, Jr. et al. ................ | 385/85 |
| 6,957,920 B2 | * | 10/2005 | Luther et al. .................... | 385/85 |
| 7,077,576 B2 | | 7/2006 | Luther et al. .................... | 385/59 |
| 7,216,512 B2 | | 5/2007 | Danley et al. ................... | 65/392 |
| 7,261,469 B1 | | 8/2007 | Dean et al. ...................... | 385/60 |
| 7,264,403 B1 | | 9/2007 | Danley et al. ................... | 385/60 |
| 7,267,491 B2 | | 9/2007 | Luther et al. .................... | 385/85 |
| 7,377,700 B2 | | 5/2008 | Manning et al. ................ | 385/72 |
| 7,393,142 B2 | * | 7/2008 | Dean et al. ...................... | 385/58 |
| 2003/0016935 A1 | | 1/2003 | Nakajima ..................... | 385/137 |
| 2003/0235374 A1 | | 12/2003 | Luther et al. .................... | 385/85 |
| 2005/0094945 A1 | | 5/2005 | Danley et al. ................... | 385/78 |

FOREIGN PATENT DOCUMENTS

| WO | WO02/056060 A2 | 7/2002 |
|---|---|---|
| WO | WO2007/075240 A1 | 7/2007 |

* cited by examiner

Primary Examiner — Eric Wong

(57) ABSTRACT

Disclosed are multifiber ferrule assemblies and methods for manufacturing the same. In one embodiment, a finished multifiber ferrule can be provided with a front end having a first front surface that extends beyond a second front surface, thereby inhibiting interaction with a laser beam during processing. A plurality of optical fibers can be fixed within respective optical fiber bores and extend from respective optical fiber bore openings to a position beyond the first front surface. The plurality of optical fibers can be processed by cutting and polishing with a laser beam for providing each optical fiber with a final polished end surface located beyond the first front surface. In further embodiments, an offset structure is positioned with respect to a finished multifiber ferrule after cutting and polishing the optical fibers.

18 Claims, 14 Drawing Sheets

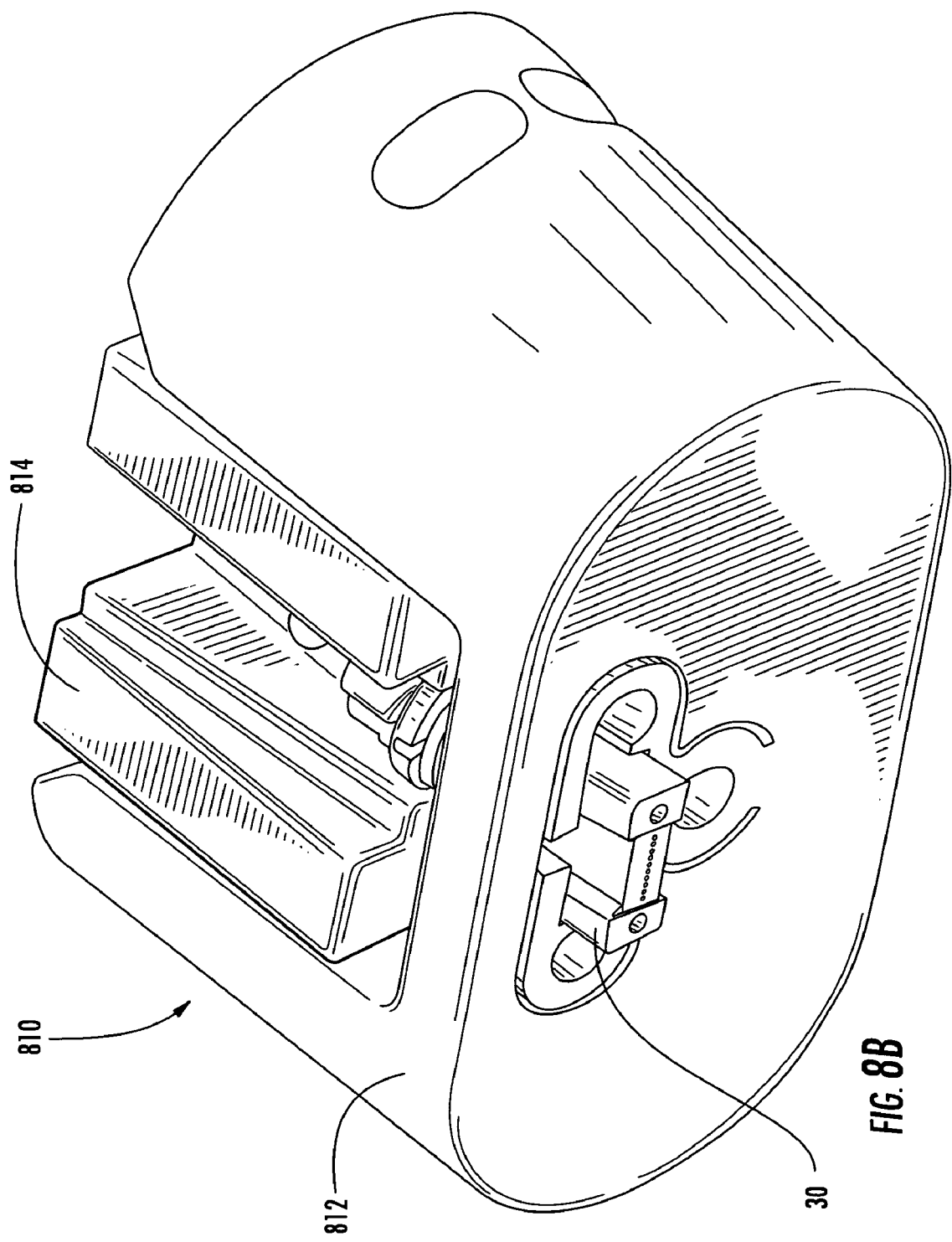

OPTICAL FERRULE ASSEMBLIES AND METHODS OF MAKING THE SAME

RELATED APPLICATIONS

This application claims the benefit of priority under 35 U.S.C. §119(e) of U.S. Provisional Application Ser. No. 61/117,941 filed on Nov. 25, 2008, which is incorporated by reference herein.

FIELD OF THE INVENTION

The present invention relates generally to optical fiber assemblies, and more particularly, to optical ferrule assemblies and methods for making the same.

TECHNICAL BACKGROUND

Optical fiber communication systems typically include optical fiber connectors. For instance, one or more optical fiber connectors can be used to join adjacent segments of optical fiber together for creating optical connections that can be connected, disconnected, and/or reconfigured as desired. For instance, one or more optical fiber connectors can be used for joining an optical fiber segment to an optical device or joining two optical fiber segments. Typical optical fiber connectors include a conventional ferrule designed to hold an optical fiber in an appropriate orientation for optically joining the end of the optical fiber segment to an optical interface of an optical device or another optical fiber segment.

Conventional optical ferrule assemblies include one or more optical fibers that typically extend (i.e., protrude) from a face of a conventional ferrule at an appropriate distance from the face of the ferrule. Thereafter, the end of the optical fibers are shaped and/or polished using a conventional mechanical polishing process to smooth and reduce defects in the face of the optical fiber end for reducing optical insertion loss. In other words, reducing defects in the optical fiber end faces enhances the physical contact between the end faces of mating optical fibers, thereby improving optical coupling at the interface therebetween.

SUMMARY

Multifiber ferrule assemblies and methods for manufacturing multifiber ferrule assemblies are disclosed. In one embodiment, a finished multifiber ferrule can be provided with a front end having a first front surface that extends beyond a second front surface, thereby inhibiting interaction with a laser beam during processing. A plurality of optical fibers can be fixed within respective optical fiber bores of the finished multifiber ferrule and extend from respective optical fiber bore openings to a position beyond the first front surface. The plurality of optical fibers can be processed by cutting and polishing with a laser beam for providing each optical fiber with a final polished end surface located beyond the first front surface. In further embodiments, an offset structure is positioned with respect to a finished multifiber ferrule after cutting and polishing the optical fibers. Additionally, several different methods for making the multifiber ferrule assemblies using a laser for cutting and polishing the optical fibers are disclosed.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

These and other features, aspects and advantages of the present invention are better understood when the following detailed description of the invention is read with reference to the accompanying drawings, in which:

FIGS. 8B and 8C are detailed perspective views of portions of the handler assembly shown in FIG. 8A;

DESCRIPTION OF EXAMPLE EMBODIMENTS

The present invention will now be described more fully hereinafter with reference to the accompanying drawings in which example embodiments of the invention are shown. However, this invention may be embodied in many different forms and should not be construed as limited to the embodiments set forth herein. Like reference numbers refer to like elements throughout the various drawings.

Figure 1:
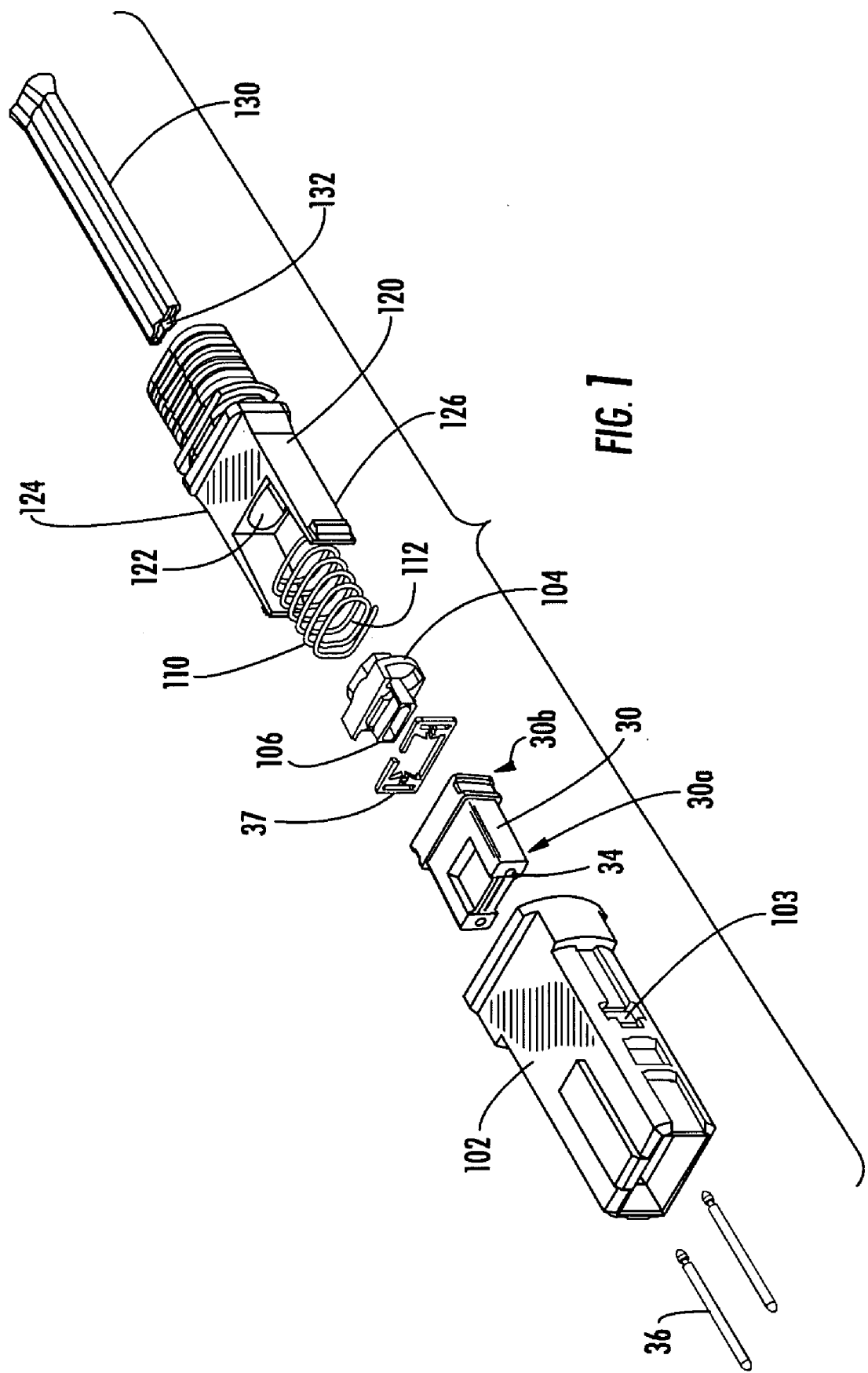
FIG. 1 is an exploded perspective view of a explanatory fiber optic connector having a multifiber ferrule assembly in accordance with aspects of the present invention.

FIG. 1 is an exploded perspective view of a fiber optic connector 100 including an example multifiber ferrule assembly 20 for mating in an optical connection. As shown, the multifiber assembly comprises an MT-type multifiber ferrule although other types of multifiber ferrules may be used in further examples.

Figure 2:
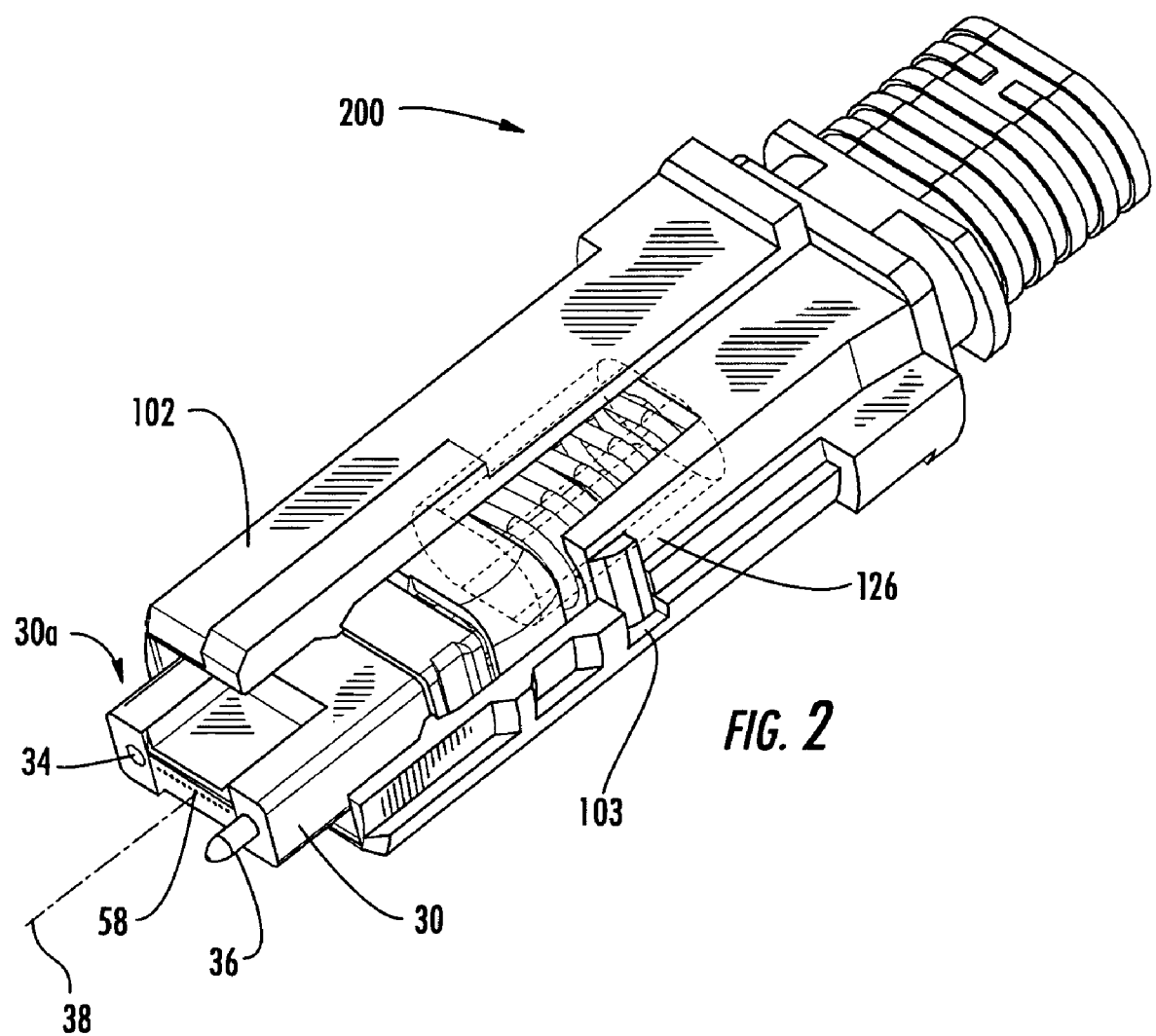
FIG. 2 is an assembled view of another explanatory fiber optic connector.

The fiber optic connector 100 can comprise various configurations. In one example, aspects of the multifiber ferrule assembly 20 can be incorporated in the fiber optic connector illustrated and described in U.S. Pat. No. 7,077,576 to Luther et al., issued on Jul. 18, 2006, the disclosure of which is incorporated by reference in its entirety. FIG. 1 illustrates an exploded view of one example fiber optic connector 100 while FIG. 2 illustrates an assembled view of another example fiber optic connector 200 that can include like parts represented by identical reference numbers. The optic connectors 100, 200 are just examples of fiber optic connectors that can incorporate a multifiber ferrule assembly 20 in accordance with aspects of the present invention.

Referring to FIG. 1, the example fiber optic connector 100 can include a multifiber ferrule assembly 20 for mating in an optical connection. The multifiber ferrule assembly 20 includes a finished multifiber ferrule 30 with a front end 30a and a rear end 30b and one or more optical fibers (not shown for clarity) inserted into finished multifiber ferrule 30. As used herein, "finished multifiber ferrule" means that after the optical fibers are inserted into the ferrule the front end of the ferrule does not require a mechanical grinding or polish for creating the desired geometry for the ferrule and/or optical fibers; however, a cleaning or wiping process or the like may be used on the finished multifiber ferrule. Finished multifiber ferrule 30 can include at least one guide pin hole 34 that is adapted to receive a respective guide pin 36 to align the finished multifiber ferrule 30 with an opposing ferrule of another mating fiber optic connector. In the exemplary embodiments shown herein, the finished multifiber ferrule 30 is and MT-type ferrule with a ferrule body defining a pair of guide pin holes 34 configured to receive respective guide pins 36. The guide pin holes 34 can extend along a longitudinal axis 38 (FIG. 2) of the finished multifiber ferrule 30. A guide pin keeper 37 can be positioned adjacent a rear face of a rear end 30b to secure the guide pins 36. The guide pins 36 can be secured such that the free ends of the guide pins 36 protrude forwardly from the end face of the front end 30a. The guide pins 36 can be secured to protrude a sufficient distance to engage guide pin holes in the ferrule of the mating fiber optic connector, thereby aligning the optical fibers mounted within the respective bores of the opposing ferrules.

As further illustrated in FIG. 1, the optic connector 100 may optionally comprise a spring seat 104, a coil spring 110, a spring push 120, a lead-in tube 130 and a generally hollow connector housing 102. Other than the multifiber ferrule assembly 20, various components of the fiber optic connector 100 are optional and the functions of these components are generally known. Thus, each optional component will not be described in detail herein except as necessary to enable one of ordinary skill in the art to understand and fully appreciate the invention. Furthermore, it will be readily understood by those skilled in the art that each of the optional components may be configured in any number of different shapes, sizes and constructions without departing from the intended scope of the invention, as defined by the appended claims.

The optional spring seat 104 of the example embodiment shown in FIG. 1, can be positioned adjacent the rear face of the rear end 30b between the finished multifiber ferrule 30 and the coil spring 110. An opening 106 extending lengthwise through the spring seat 104 can be configured to permit the lead-in tube 130 and the end portions of the optical fibers (not shown) to pass through the spring push 120 to the rear face of the finished multifiber ferrule 30. The lead-in tube 130 can be positioned within an opening 122 of the spring push 120, an opening 112 of the coil spring 110 and the opening 106 of the spring seat 104. An opening 132 extending lengthwise through the lead-in tube 130 receives and guides the end portions of the optical fibers of the fiber optic cable in respective bore openings 52 of the finished multifiber ferrule 30.

The fiber optic connector 100 can include a mounting structure positioned with respect to the multifiber ferrule assembly. For example, as shown in FIG. 2, the mounting structure can comprise a housing 102 with the multifiber ferrule assembly 20 at least partially positioned within the housing 102. As shown, the finished multifiber ferrule 30 and guide pins 36, the guide pin keeper 37, the spring seat 104, the coil spring 110, a forward portion 124 of the spring push 120 and the lead-in tube 130 can be positioned within the connector housing 102. In one example, flexible arms 126 provided on spring push 120 can extend lengthwise from the forward portion 124 to engage openings 103 formed in the connector housing 102 for securing the spring push 122 with the connector housing 102. A forward mechanical stop (not visible) can be provided on the interior surface of the connector housing 102 so that the finished multifiber ferrule 30 is movable when the disposed within the connector housing 102, but retained therein. The finished multifiber ferrule 30 is biased in the forward direction by the coil spring 110 and the spring seat 104.

Figure 3:
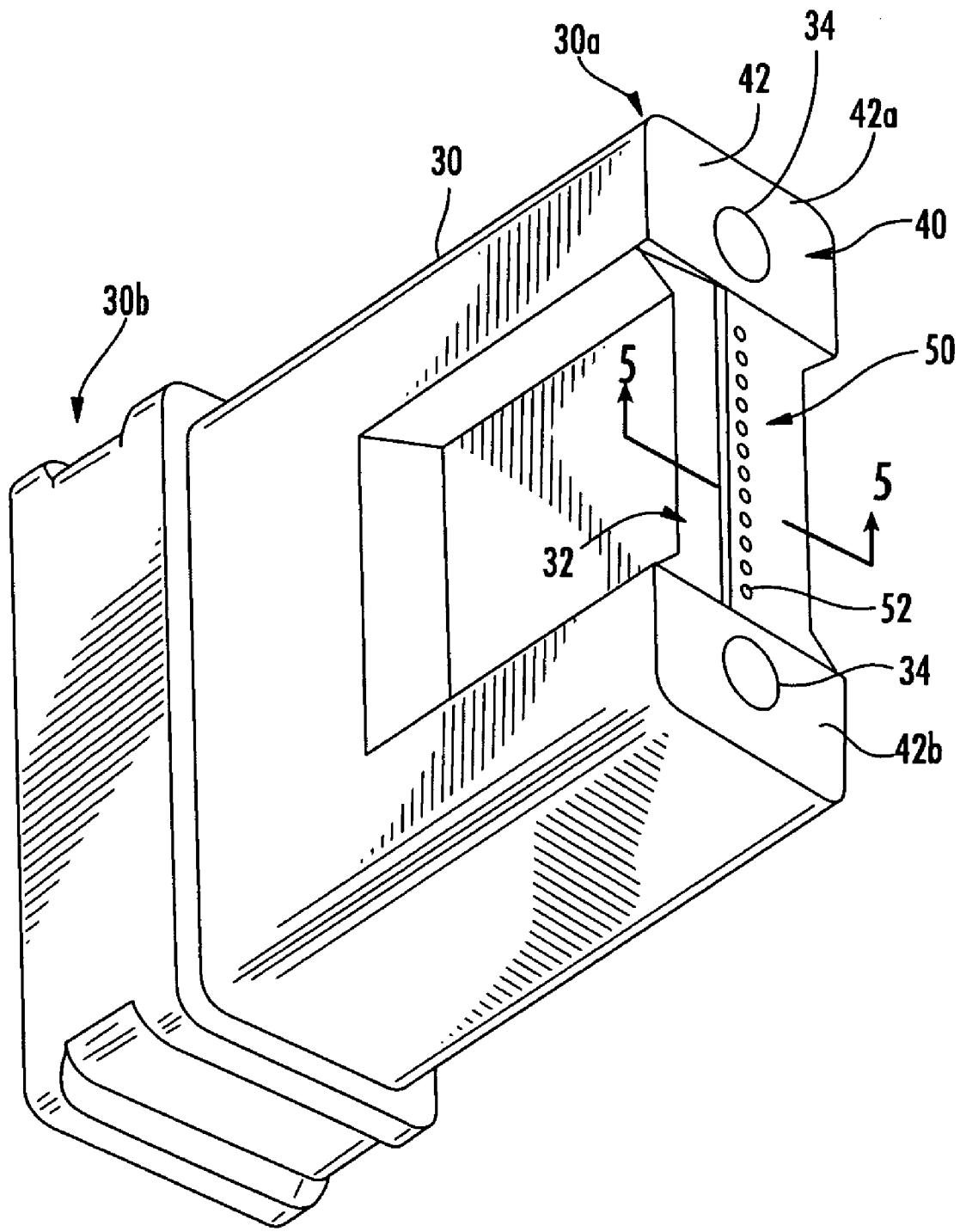
FIG. 3 is a perspective view of a finished multifiber ferrule of the multifiber ferrule assembly illustrated in FIGS. 1 and 2.

FIG. 3 is a perspective view of the finished multifiber ferrule 30 of the multifiber ferrule assembly 20 illustrated in FIGS. 1 and 2. Of course, the concept of the disclose may be practiced with other finished multifiber ferrules. Finished multifiber ferrule 30 can be fabricated in a wide variety of ways. For example the finished multifiber ferrule 30 may be fabricated by an injection molding process, the machining process and/or other fabrication methods. The finished multifiber ferrule 30, for instance, may be fabricated as an initial multifiber ferrule by an injection molding process. A subsequent machining process may be carried out on portions of the molded multifiber ferrule in order to increase dimensional precision and provide the finished multifiber ferrule. As shown in FIG. 3, certain dimensions of the finished multifiber ferrule may therefore be established prior to fabricating the multifiber ferrule assembly 20.

Figure 4:
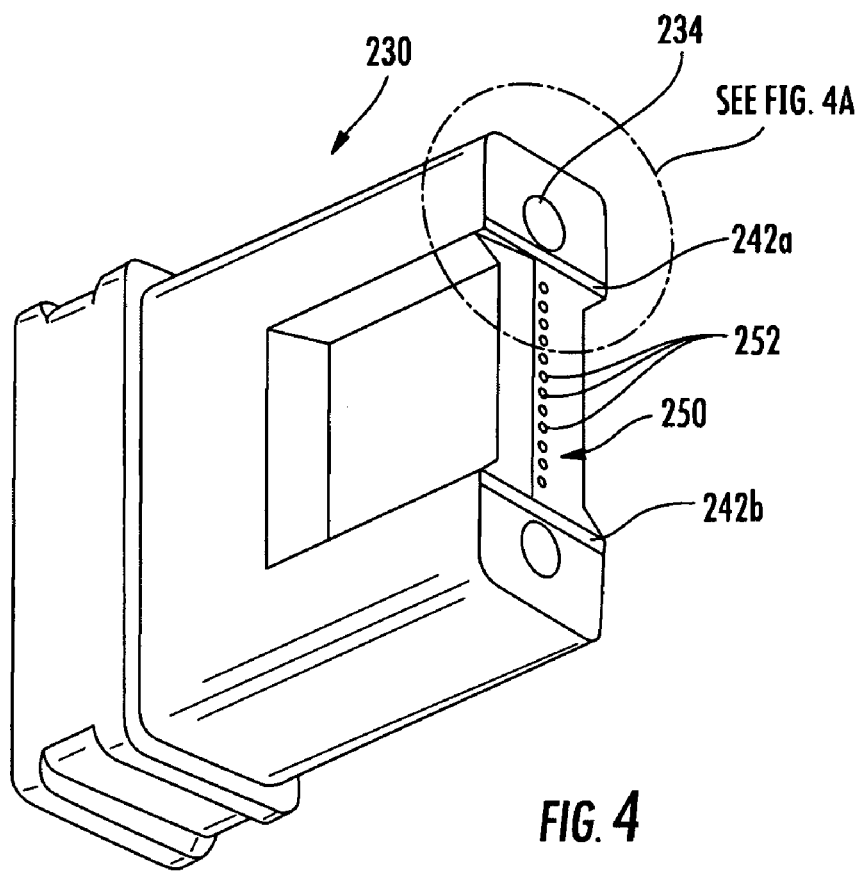
FIG. 4 is a perspective view of another finished multifiber ferrule incorporating example aspects of the present invention.

As shown, in FIG. 3, the front end 30a of the finished multifiber ferrule 30 can include a first front surface 40 and at least a second front surface 50. As shown in FIG. 4, the first front surface 40 extends a first distance "d" beyond the second front surface 50 and the second front surface 50 includes a plurality of optical fiber bore openings 52. In one example, an offset structure, such as at least one pedestal 42, can include the first front surface 40. Although a single pedestal may be used, two or more pedestals may be incorporated in other examples. For instance, as shown in FIG. 3, the pedestal 42 can include a first pedestal 42a and a second pedestal 42b wherein the first front surface 40 can be defined by the first pedestal 42a and the second pedestal 42b. The at least one pedestal 42 can be located on one side of the second front surface. Moreover, the at least one pedestal can comprise a plurality of pedestals located on one side, opposite sides, adjacent sides or other configurations. For instance, as shown in FIG. 3, the at least one pedestal 42 can be provided with a first pedestal 42a and a second pedestal 42b disposed on opposite sides of the second front surface 50. As illustrated, disposing the first pedestal 42a and second pedestal 42b on opposite sides positions the bore openings 52 substantially between the first pedestal 42a and the second pedestal 42b. In further configurations, it is contemplated that the bore openings 52 may be located such that they are not substantially between the first pedestal 42a and the second pedestal 42b. As shown in FIG. 3, the guide pin holes 34 can optionally extend through the first front surface 40 of the corresponding pedestals 42a, 42b.

Figure 4A:
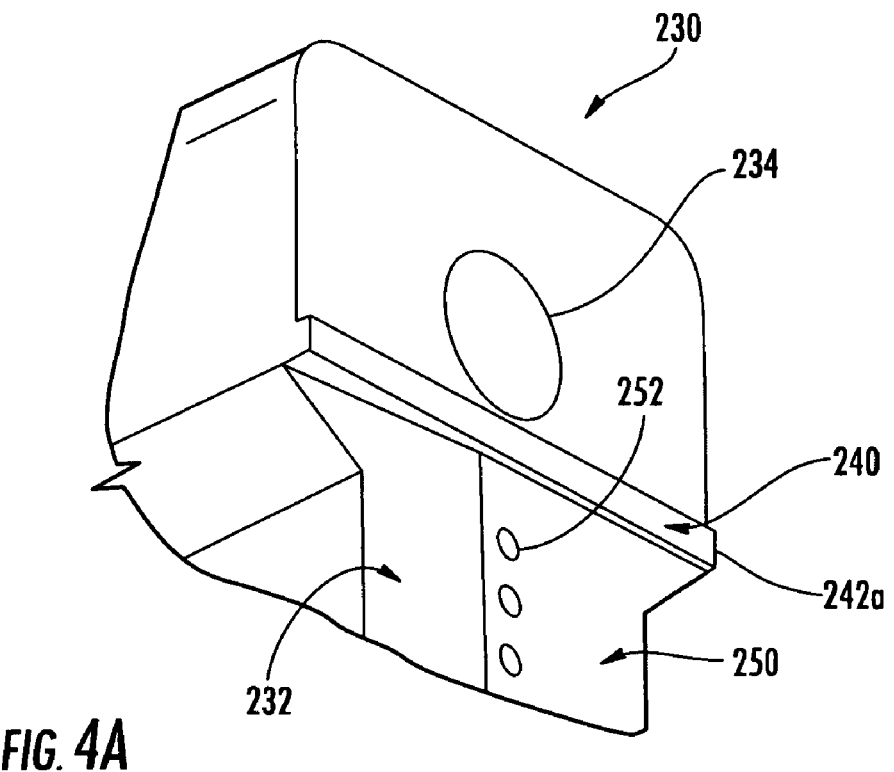
FIG. 4A is an enlarged view of portions of the finished multifiber ferrule of FIG. 4.

FIGS. 4 and 4A illustrate an alternative example of a finished multifiber ferrule 230 including many of the features of the finished multifiber ferrule 30 discussed above. As shown, however, the finished multifiber ferrule 230 includes an alternative pedestal including a first pedestal 242a and a second pedestal 242b wherein a first front surface 240 can be defined by the first pedestal 242a and the second pedestal 242b. The at least one pedestal 242 can be located on one side of the second front surface. Moreover, the at least one pedestal can comprise a plurality of pedestals located on one side, opposite sides, adjacent sides or other configurations. For instance, as shown in FIG. 4, the at least one pedestal can be provided with a first pedestal 242a and a second pedestal 242b disposed on opposite sides of a second front surface 250. As illustrated, disposing the first pedestal 242a and second pedestal 242b on opposite sides can arrange bore openings 252 substantially between the first pedestal 242a and the second pedestal 242b. In further configurations, it is contemplated that the bore openings 252 may be located such that they are not substantially between the first pedestal 242a and the second pedestal 242b. As shown in FIGS. 4 and 4A, each of the pedestals 242a, 242b can be arranged to extend between a corresponding guide pine hole 234 and the bore openings 252. For example, as shown in FIG. 4A, the first pedestal 242a can be positioned between the guide pin hole 234 and the bore openings 252. Likewise, the second pedestal 242b can be positioned between the other guide pin hole and the bore openings. Therefore, it will be appreciated the first front surface 240 can be isolated from the guide pin holes 234 since the guide pin holes do not extend through the first front surface 240. Such an arrangement can help prevent debris or other contaminants associated with the guide pins 36 from corrupting the otherwise clean first front surface 240. Moreover, the pedestals 242a, 242b can act as barriers to inhibit, such as prevent, debris or other contaminants associated with the guide pins from propagating toward the bore openings 252 and associated optical fibers extending from the bore openings 252.

Figure 5:
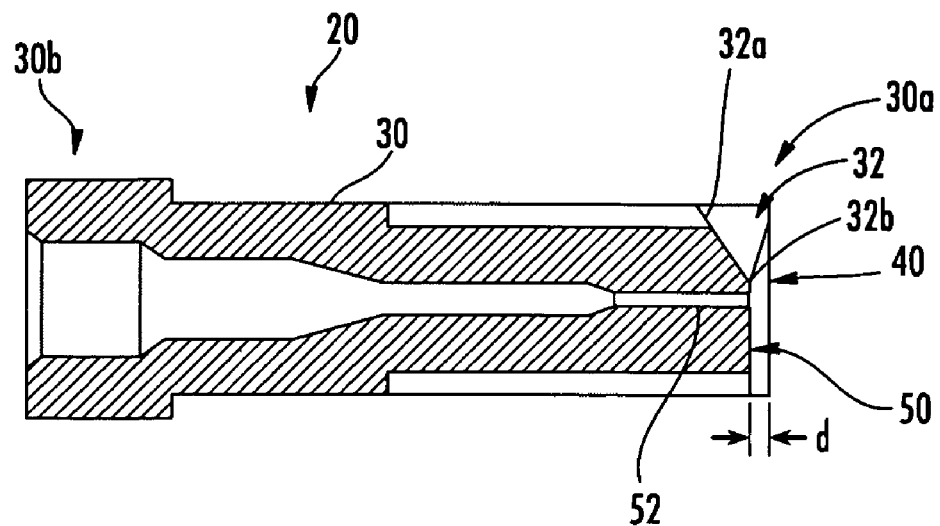
FIG. 5 is a sectional view of the finished multifiber ferrule along line 4-4 of FIG. 3.
Figure 6:
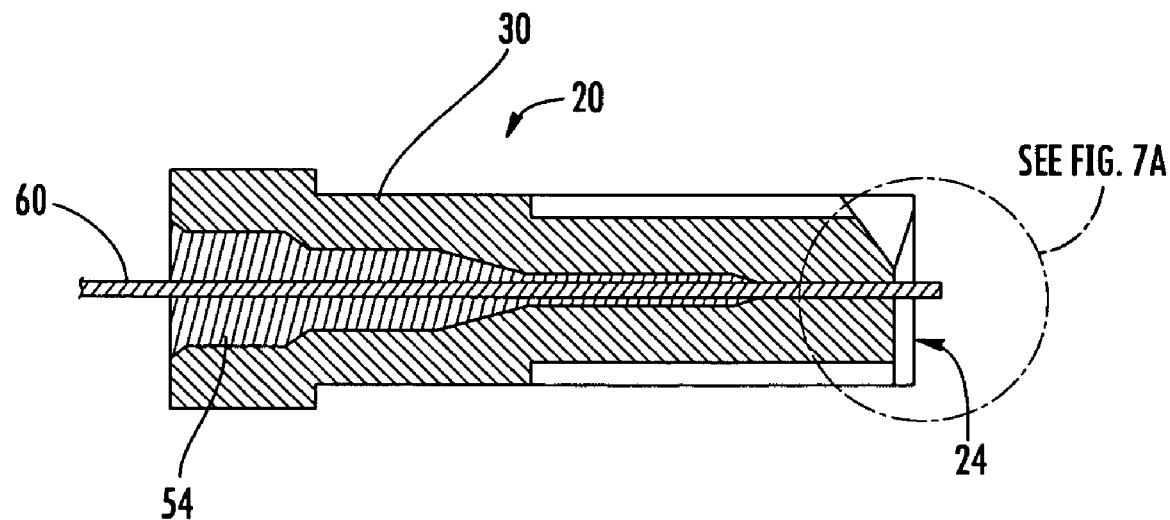
FIG. 6 is a sectional view similar to FIG. 4 with a plurality of optical fibers fixed to the finished multifiber ferrule.
Figure 7A:
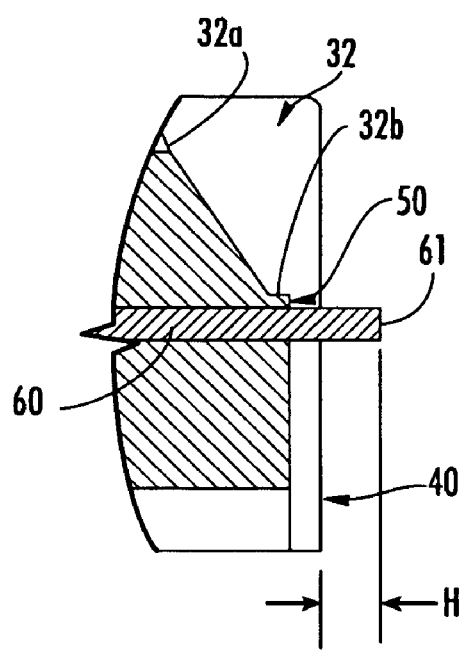
FIG. 7A is an enlarged view of portions of FIG. 5.

Example methods for manufacturing a multifiber ferrule assembly are described with respect to multifiber ferrule assembly 20 having a finished multifiber ferrule, but are applicable to any suitable multifiber ferrule or assembly. For instance, the concepts disclosed herein may be used with ferrules that require mechanical polishing or the like if desired and do not require a finished multifiber ferrule. As shown in FIG. 5 the explanatory method includes the step of providing the finished multifiber ferrule 30. Thereafter, one or more optical fibers 60 are inserted into finished multifiber ferrule for fixing the optical fibers 60 to the finished multifiber ferrule 30 such as with an adhesive. FIG. 6 illustrates a cross-section showing one of the optical fibers 60 being fixed within a corresponding bore 52 with the understanding that each optical fiber 60 can be fixed to a corresponding one of the bores 52 in a similar manner. An adhesive 54 or the like is used for fixing the position of the optical fibers 60 within the corresponding bore 52. As shown in FIG. 7A, the plurality of optical fibers 60 extend from a respective bore 52 to a position beyond the first front surface 40. For instance, as shown in FIG. 7A, a preprocessed end portion 61 of the optical fibers 60 extend an unprocessed distance "H" from the first front surface 40. By way of example, unprocessed distance H is about 10 nanometers or more, but other suitable unprocessed dimensions H are possible.

As shown, the finished multifiber ferrules 30, 230 can also include an optional backdraft portion 32, 232. This backdraft portion 32 aids processing according to the disclosed methods by providing a relief during the processing and inhibiting marking and/or damage to the front end of the ferrule. Specifically, the backdraft portion inhibits interaction between a laser beam and/or debris during cutting and/or polishing, thereby inhibiting marking and/or damage to the front end of the ferrule. As shown in FIG. 7A, the backdraft portion 32 can include a surface 32a that is angled with respect to the longitudinal axis of the finished multifiber ferrule 30. Backdraft portion 32 can have any suitable angle such as between 30 to 45 degrees from the front face, but other suitable angles are possible. Further, the backdraft can start at any suitable distance from bores 52 so long as dimensions and structural integrity of the ferrule are preserved. As further illustrated, the backdraft portion 32 can also be optionally recessed rearward from the second front surface 50. By way of example, a shoulder 32b can be formed adjacent to the backdraft, thereby permitting the backdraft portion 32 to be recessed rearward from the second front surface 50. For instance, shoulder 32b can have a depth of about 2 microns or greater.

Figure 7B:
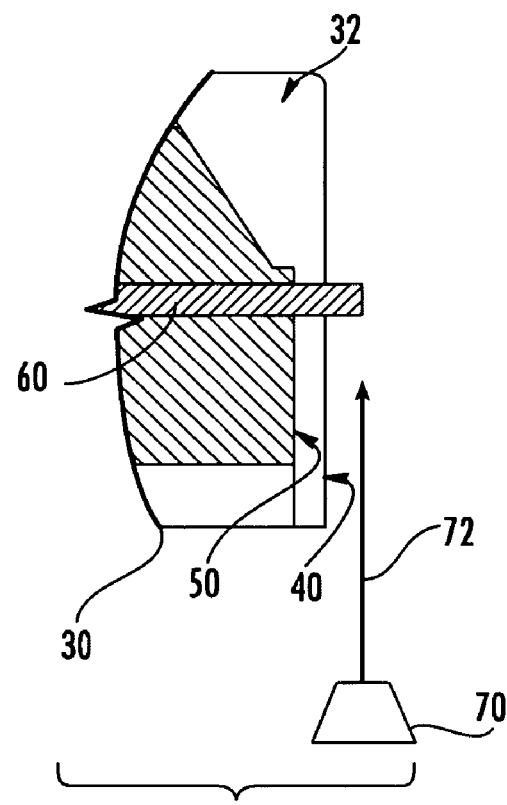
FIG. 7B is a schematic illustration demonstrating the optical fibers being processed.

The methods further include the step of processing the plurality of optical fibers 60 as shown in FIG. 7B. Processing can include cutting and/or polishing the preprocessed end portion 61 of optical fiber 60. In one example, the step of processing end portion 61 includes cutting and polishing the plurality of optical fibers 60 with a laser beam 72 of a laser 70 in one or more steps. For instance, separate steps may be used for cutting and polishing optical fibers 60 with laser 70, but cutting and polishing may also occur in one step with laser 70. Any suitable type of laser and/or mode of operation for the laser is possible. By way of example, laser 70 may be a $CO_2$ laser operating in the pulse, continuous, or other suitable mode. The angle between the laser beam 72 and optical fibers 60 may also be adjusted to produce the desired angle on the ends of optical fibers 60 such as 12 degrees, 8 degrees, or flat. Due to the distance between the preprocessed end portion 61 and the second front surface 50, the laser beam 72 can substantially avoid interaction with the finished multifiber ferrule 30 during cutting and polishing of the plurality of optical fibers 60. Optional backdraft portion is provided to further reduce the probability of interaction between refracted portions of the laser beam/debris and the finished multifiber ferrule. For instance, as schematically shown in FIG. 7B, the front end 30a of the finished multifiber ferrule 30 can include a backdraft portion 32 and the laser beam 72 can be designed to cut and/or polish the plurality of optical fibers 60 in a general direction from the second front surface 50 toward the backdraft portion 32.

Figure 7C:
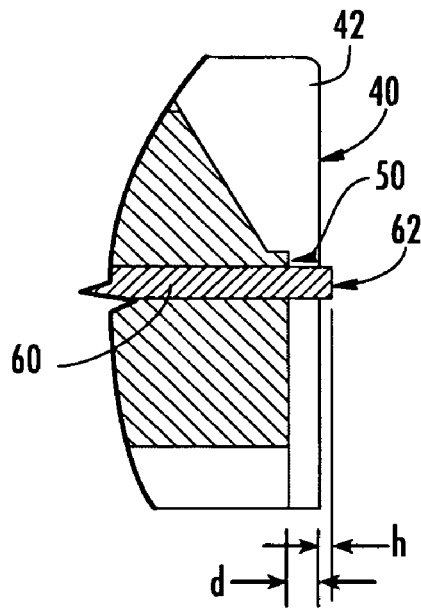
FIG. 7C is a view illustrating portions of the multifiber ferrule assembly after the optical fibers are processed with the fibers having an effective fiber height "h" for mating in an optical connection.
Figure 7D:
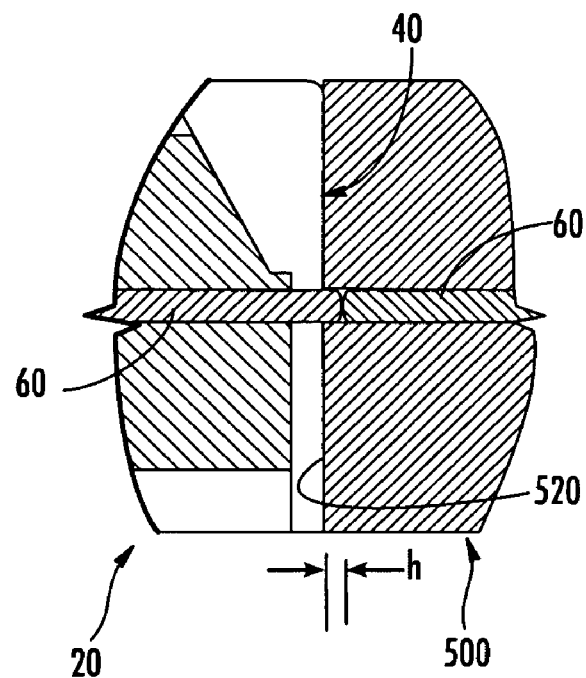
FIG. 7D illustrates the multifiber ferrule assembly of FIG. 7C being mated in an optical connection.

As shown in FIG. 7C, once the processing of the optical fibers 60 is complete, each optical fiber 60 can be provided with a final polished end surface 62 located beyond the first front surface 40. The first front surface 40 is disposed relative to the optical fibers 60 with an effective fiber height for mating in an optical connection as shown in FIG. 7D. In other words, optical fibers 60 have a short protrusion beyond the first front surface 40, thereby providing the effective fiber height for physical contact with optical fibers of a complimentary optical fiber connector. FIG. 7D depicts the optical mating with a complimentary multifiber optical assembly 500 and an interface 520 therebetween. Thus, after processing, a plurality of optical fibers 60 are fixed to the finished multifiber ferrule 30, wherein the plurality of optical fibers 60 extend from a respective one of the optical fiber bore openings 52. Each optical fiber 60 includes a final polished end surface 62 located at a second distance "h" (i.e., a short protrusion)

beyond the first front surface 40, wherein the first front surface 40 is configured to present each of the fibers 60 with an effective fiber height for mating in an optical connection. As shown in FIG. 7C, in one example, the effective fiber height is substantially equal to the second distance "h" although the effective fiber height may be greater or less than the second distance "h" in further examples.

As mentioned above with reference to FIG. 5, the first front surface 40 extends a first distance "d" beyond the second front surface 50. As shown in FIG. 7C, the first distance "d" can be greater than the second distance "h" although the first distance "d" can be substantially equal or less than the second distance "h" in other variations. By way of example, the first distance can be at least 15 microns or even at least 30 microns. Second distance "h" can have any suitable distances depending on the application. For example, the second distance "h" can be from about 0.5 microns to about 5 microns, such as from about 1 micron to about 3 microns. Likewise, the first distance "d" can have any suitable distances depending on the application such at least 1 micron. Moreover, any suitable combinations of the first distance "d" and the second distance "h" are possible so long as the desired optical performance is accomplished. For instance, the first distance "d" may be about 30 to about 40 microns and the second distance "h" is between about 0.5 microns to about 5 microns. In other embodiments, the second distance "h" is at least 1 micron and in other embodiments the second distance is between about 1 micro and about 3 microns. A long protrusion of the optical fibers is defined by the sum of first distance "d" and second distance "h". The particular dimensions for first distance "d" and second distance "h" may depend of the ferrule design used.

For instance, suitable values for the multifiber ferrule assemblies may vary depending on the type of material selected for the ferrule. By way of example, a thermoset ferrue may have a co-planarity in the range of about 75 nanometers to about 300 nanometers and a long protrusion (i.e., first distance "d" plus second distance "h") of about 15-20 nanometers above the ferrule face and a short protrusion (i.e., second distance "h") of about 0.5-5 nanometers above the bumpers of the ferrule. On the other hand, a thermoplastic ferrule may have a co-planarity in the range of about 200 nanometers to about 400 nanometers and a long protrusion of about 30-35 nanometers above the ferrule face and a short protrusion of about 0.5-5 nanometers above the bumpers of the ferrule. As known in the art, co-planarity is the sum of the deviation of the longest protruding optical fiber plus the deviation of the shortest protruding optical fiber from a least fit square line fitted to the optical fiber protrusion profile for the given finished multifiber ferrule assembly.

Figure 8A:
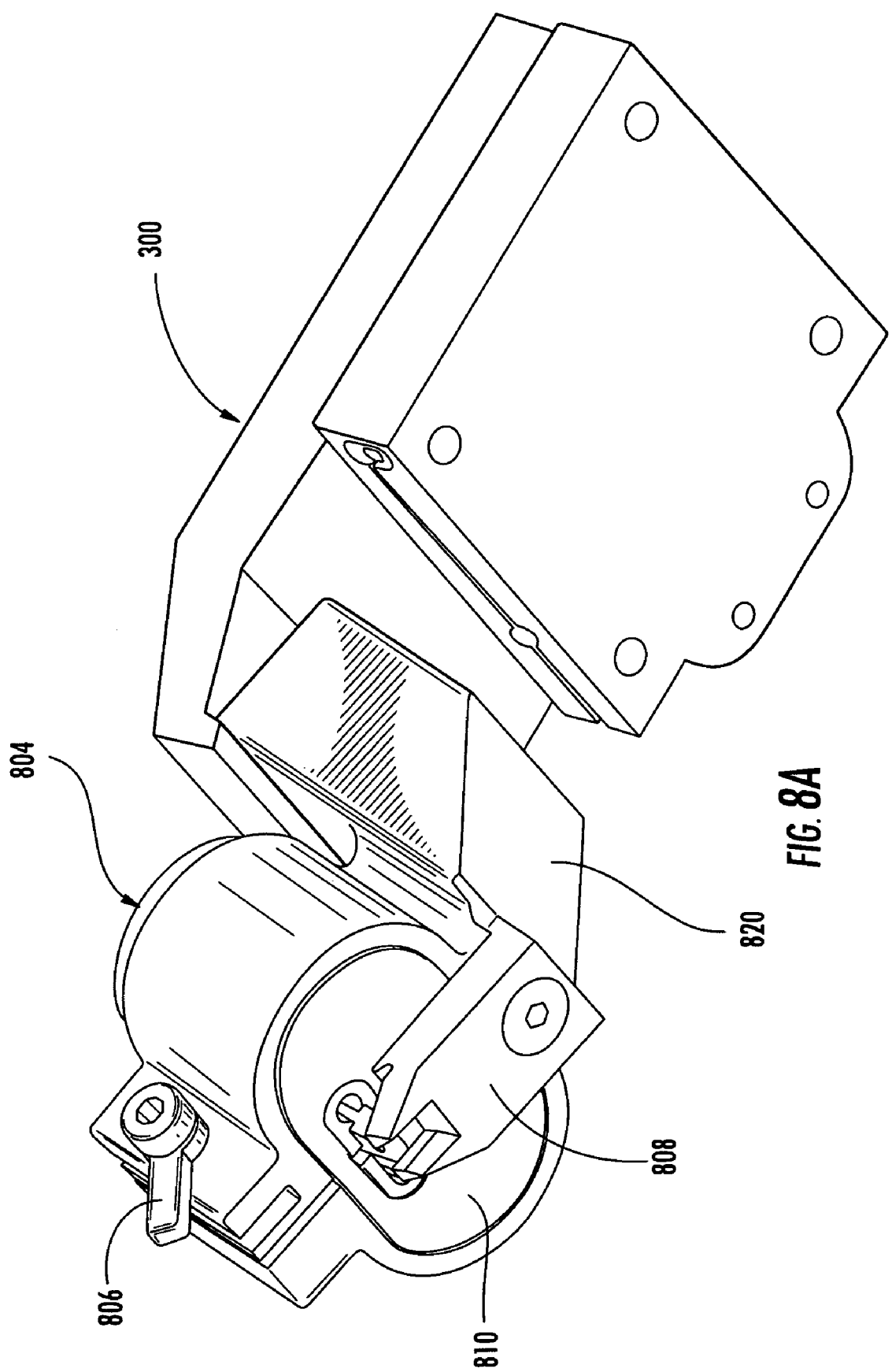
FIG. 8A is detailed view of a handler assembly of the apparatus of FIG. 8.
Figure 8C:
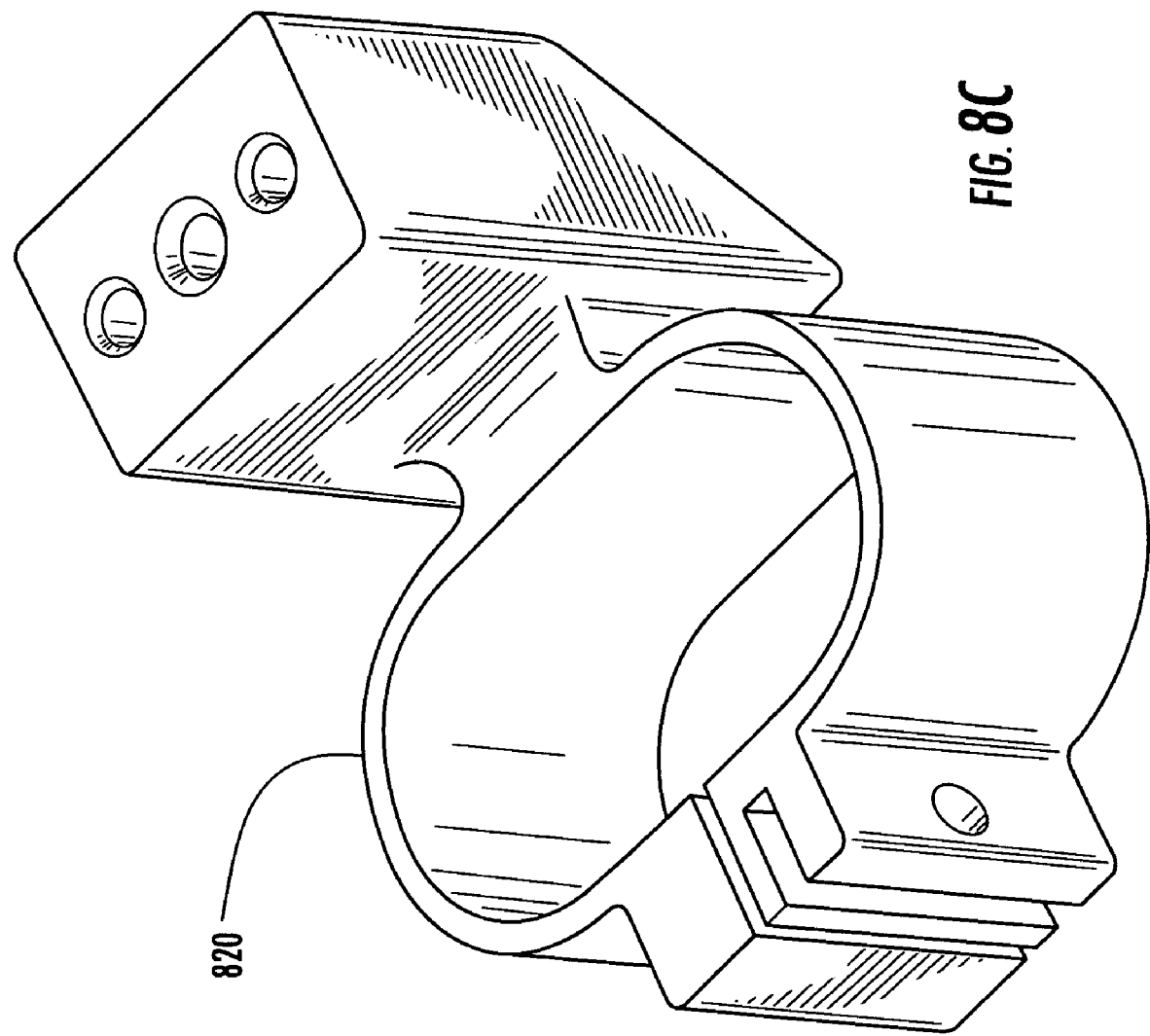
Figure 8:
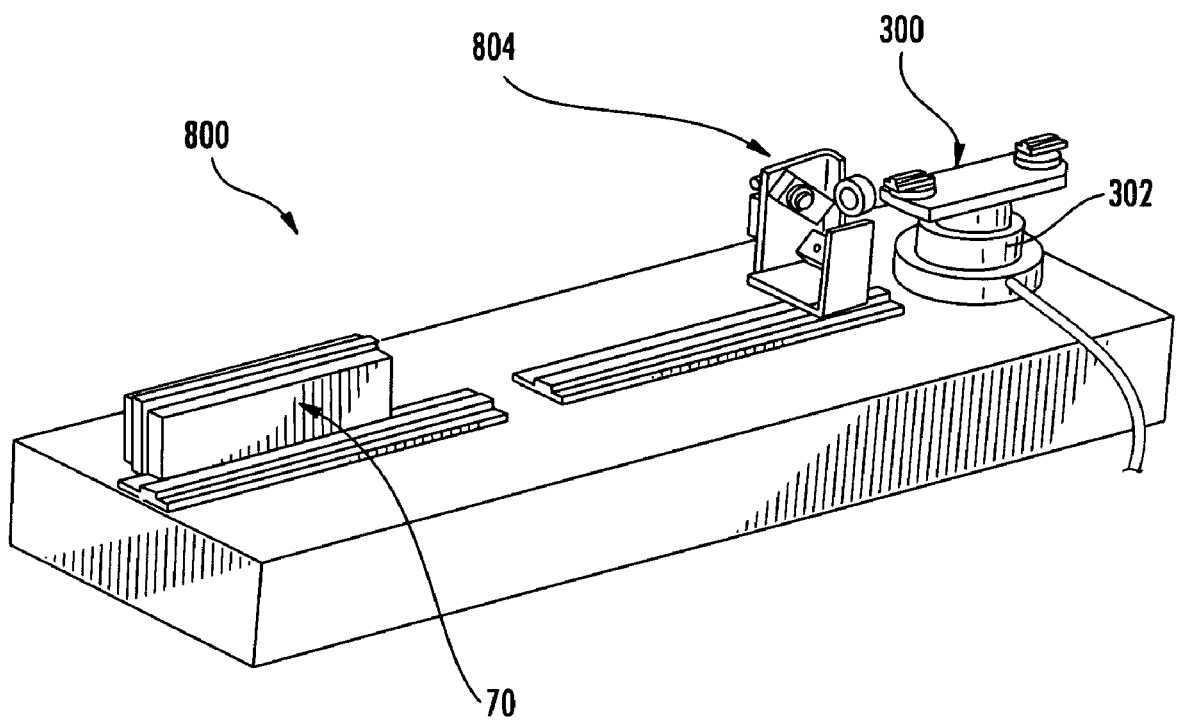
FIG. 8 is a schematic view of a first explanatory apparatus and method for processing multifiber ferrule assemblies.

Processing of the plurality of optical fibers 60 can be carried out in various ways using laser 70. By way of example, the multifiber ferrule assembly may move with respect to the laser beam, vice versa, or combinations of both movements. FIG. 8 is a schematic illustration of an explanatory apparatus 800 and method for processing multifiber ferrule assemblies 20. As shown, apparatus 800 includes a base 802 having an adjustable mounting structure such as mounting rails for positioning laser 70 and an optical path adjustment device 804 in the desired locations. Additionally, apparatus 800 includes a rotatable work holder such as a turntable 300 mounted behind the optical path adjustment device 804. As depicted, the finished multifiber ferrule 30 can be rotated on turntable 300 with respect to the laser beam 72 during the step of cutting and polishing. For example, a plurality of multifiber ferrule assemblies 20 may be mounted about the periphery of turntable 300 for improving cycle times.

Furthermore, the multifiber ferrule assemblies 20 may be secured directly to the work holder or can be held in a modular portion of the work holder for processing, inspection, geometry measurement, and the like. As shown in FIG. 8A, turntable 300 includes a handler assembly 804 attached thereto for loading the multifiber ferrule assembly therein and attaching and referencing the same relative to the turntable 300 and laser beam 72. Handler assembly 804 may also be suitable for securing to a station for inspection/measurement of the multifiber ferrule assembly after processing. As shown, handler assembly 804 uses a clamping structure on a mounting arm 820 with a quick attach/release feature 806 for securing an insert assembly 810 therein. Handler assembly 804 also includes a stop 808 attached to mounting arm 820 for positioning the multifiber ferrule assembly in the proper location. FIG. 8B and FIG. 8C respectively depict detailed perspective views showing a multifiber ferrule assembly loaded within insert assembly 810 and the mounting arm 820 of handler assembly 804. As shown in FIG. 8B, multifiber ferrule assembly 20 is loaded into insert assembly 810 so it is secured between a first portion 812 and a second portion 814 with a portion of the multifiber ferrule 30 extending beyond first portion 812. Thereafter, insert assembly 810 is placed into mounting arm 820 until multifiber ferrule 30 contacts stop 808, then attach/release feature 806 is toggled to clamp the insert assembly in position for processing. Of course, other suitable constructions and/or assemblies are possible for the handler assembly depending on the apparatus, mounting surface, etc.

An explanatory process includes securing multifiber ferrule assembly 20 in handler assembly 804 and then placing the loaded handler assembly 804 in turntable 300. Specifically, handler assembly 804 includes a port having a hardstop (not shown) for receiving and precisely positioning the multifiber ferrule in handler assembly 804. The port of handler assembly 804 may also provide protection from areas of the multifiber ferrule that need not have exposure to the laser beam. Thereafter, a first laser processing step cuts optical fibers 60 longer than required by oscillating the same back and forth with respect to laser beam 72, thereby cutting all of the optical fibers. Then the optical fibers 60 are cleaned using an air/alcohol mix or other suitable cleaning or wiping process. Next, a second laser processing step is used for polishing the ends of the cut optical fibers to the desired length with respect to the ferrule end face, again by oscillating the optical fibers with respect to the laser beam 72 for polishing the same. Moreover, turntable 300 can move at any suitable speed for processing the multifiber ferrule assembly for the given operation parameters of laser 70. By way of example, the multifiber ferrule can move at about 25 millimeters per second back and forth when using a 50-watt $CO_2$ laser operated in the CW mode at 20 kHz available from SYNRAD Inc. of Mukilteo, Wash. Of course, other suitable operating parameters are possible for the speed and/or laser operating characteristics. After cutting and polishing is finished, the handler assembly 804 can be removed from turntable 300 for securing in a station for inspection and measuring the geometry of the optical fibers. If the multifiber ferrule assembly does not meet the desired requirements and/or geometry the handler assembly 804 may be placed back into the turntable for further processing.

As shown, the backdraft portion 32 can face outward and the laser 70 can be operated radially inward from each respective multifiber ferrule assembly 20 as turntable 300 rotates about a rotation axis 304. In one example, the turntable 300 can be incrementally rotated to appropriately position one of the multifiber ferrule assemblies 20 with respect to the laser

70. Additionally, the laser 70 can be designed to translate relative to each optical fiber 60 for individual processing of the corresponding fibers of the multifiber ferrule assembly 20. In other embodiments, the laser 70 rotates, thereby oscillating (i.e., moving back and forth) the laser beam 72 across all of the optical fibers during cutting and/or polishing. Once complete, the turntable 300 may be rotated such that the next multifiber ferrule assembly can be processed in turn. While, processing of the next multifiber ferrule assembly 20, the first processed multifiber ferrule assembly 20 can be removed and replaced with another multifiber ferrule assembly for processing in turn.

Work holders for multifiber ferrules assemblies of the apparatus can have any suitable construction/operation so long as it provides the desired repeatability, tolerances, and the like for the process. For instance, the process and apparatus should produce a relatively small co-planarity among the optical fibers. Illustratively, the co-planarity among the optical fibers should be about 500 nanometers or less, other values of co-planarity such as 400 nanometer or less are also possible. Of course, bigger values of co-planarity are possible if they provide the desired optical performance. By way of example, turntable 300 is rotatably mounted on a suitable air bearing structure such as air bearing spindle 302 that is supported by a cushion of compressed air such as available from Professional Instruments Company of Hopkins, Minn., thereby maintaining highly accurate and repeatable motion such as precise runout and/or inhibiting vertical displacement during processing. For instance, the air bearing spindle 302 provides accurate and repeatable motion such as having a relatively small vertical displacement in the Z-direction such as 25 nanometers or less, which aids in maintaining co-planarity of the optical fibers. Other suitable types of arrangements using an air bearing spindle and/or other air bearing structures are possible such as discussed with respect to FIG. 10 and FIG. 11. Additionally, laser beam 72 need not cut through the respective optical fibers within the multifiber ferrule assembly 20 in one pass. In other words, the multifiber ferrule assembly 20 can oscillate relative to the laser 70, thereby forming the cut through the optical fibers in several passes past laser 70. For instance, the optical fibers may make between three and ten oscillations past laser 70 before being completely cut therethrough, but other values are possible such as one pass or more than ten passes. Of course, other embodiments may move the laser or laser beam relative to the ferrule during processing.

Figure 9:
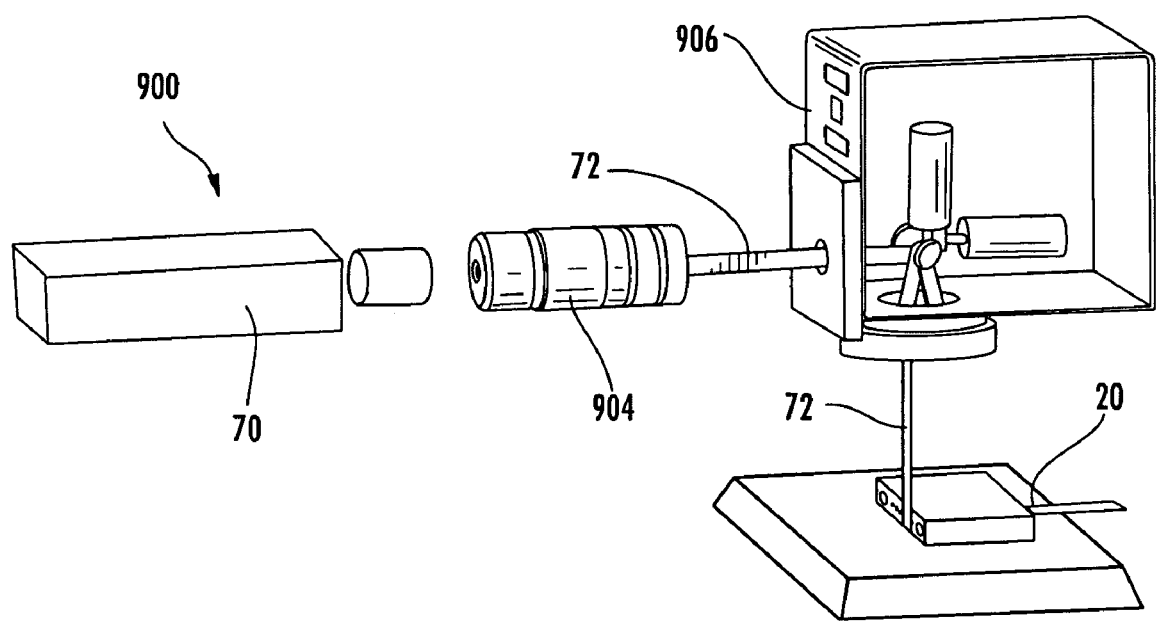
FIGS. 9-11 are respective schematic views of other explanatory apparatus and methods for processing multifiber ferrule assemblies.

FIG. 9 depicts a schematic illustration of another explanatory apparatus 900 and method for processing multifiber ferrule assemblies 20. Specifically, apparatus 900 translates laser beam 72 relative to multifiber ferrule assembly 20 during the step of cutting and polishing. Apparatus 900 includes laser 70, an F-theta lens 904, and a 2-axis galvanometer scanner 906 available from ScanLab America, Inc. of Naperville, Ill. Simply stated, the galvanometer scanner 906 moves the laser beam in the desired patterns to cut and polish the optical fibers of multifiber ferrule assembly 20. Although this apparatus is simpler because the work piece does not have to move, the co-planarity using apparatus 900 may more difficult to control compared with apparatus 800. Moreover, since the work piece does not move it is easier to accommodate different types of multifiber ferrule assemblies such as different cable sizes, different lengths of cable, etc. Additionally, apparatus 900 preferably includes a handler assembly (not shown) for repeating the positioning the multifiber ferrule assembly relative to the path of laser beam 72, protecting other portions of the assembly, and/or for inspection of the processed assembly.

Figure 10:
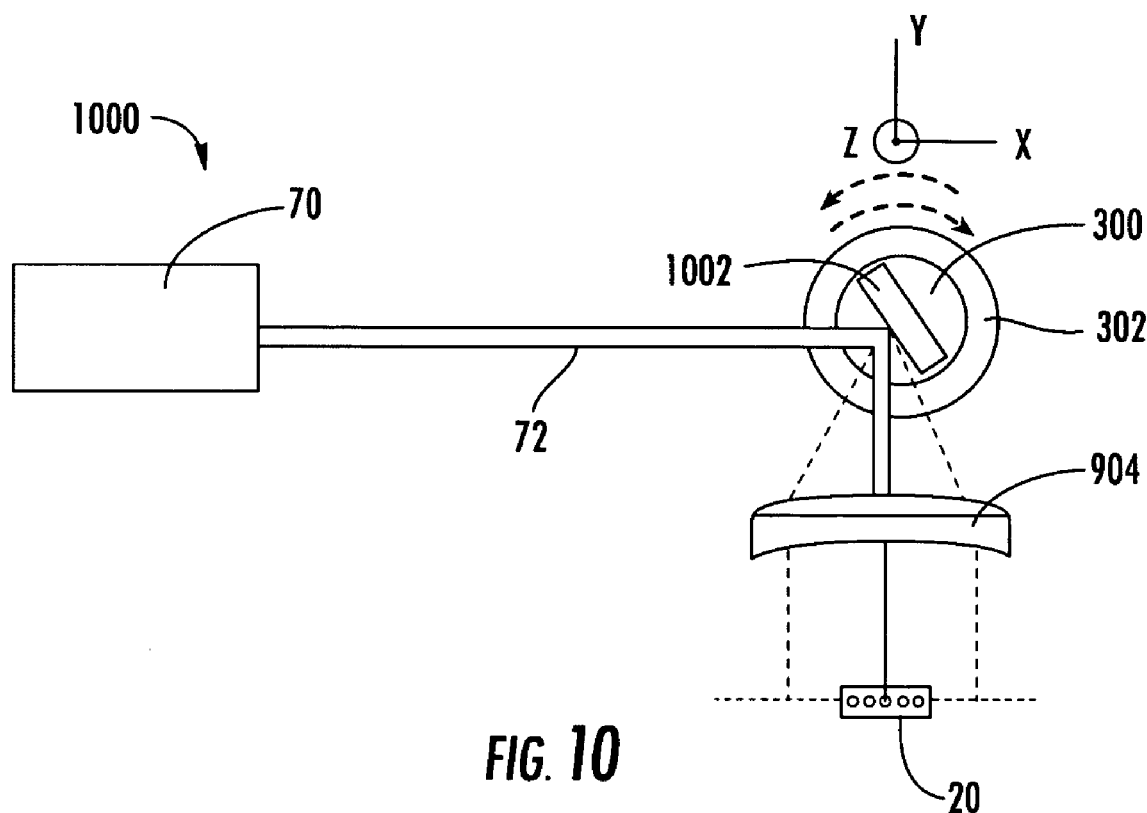
Figure 11:
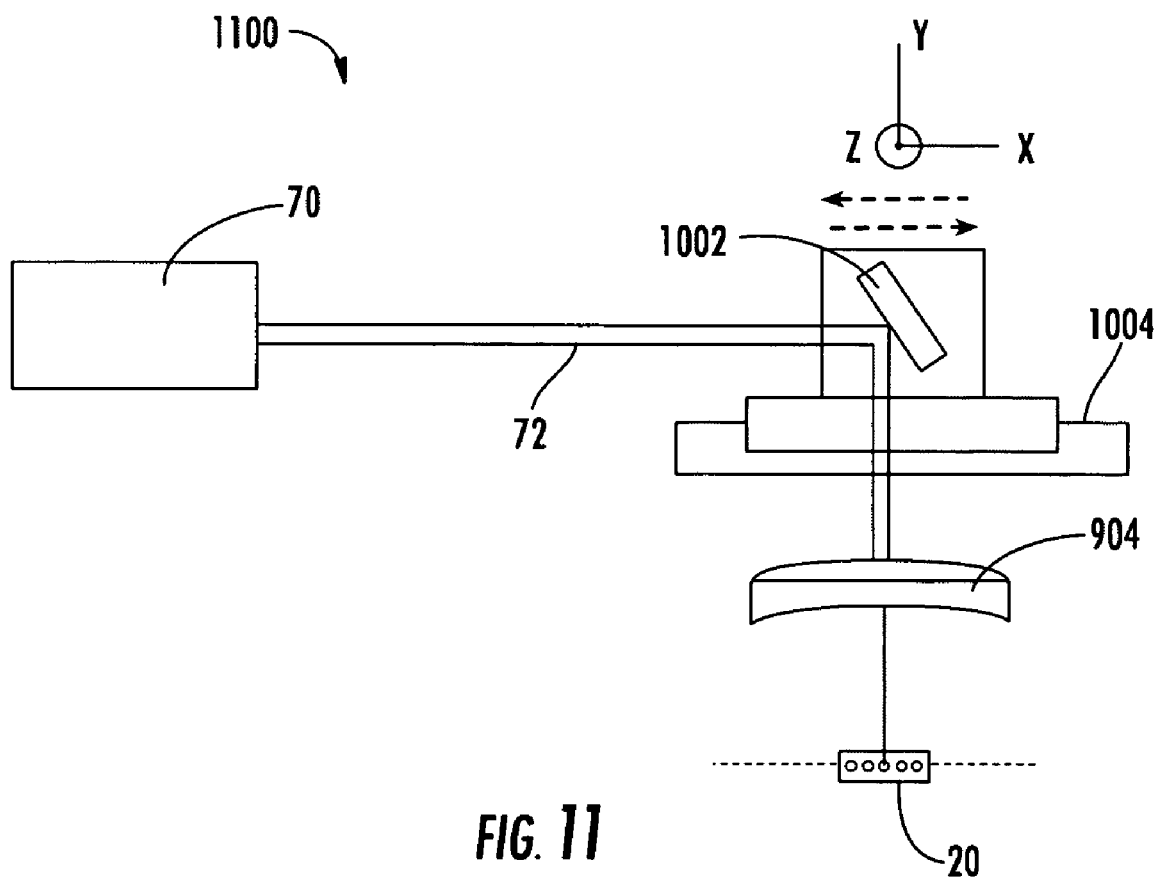

FIG. 10 shows a hybrid apparatus 1000 that combines concepts/features of apparatus 700 and apparatus 800 where the workpiece is stationary and the laser beam moves for cutting the plurality of optical fibers of multifiber ferrule assembly 20. Apparatus 1000 includes a component mounted on a turntable 300 that rotates on air bearing spindle 302. Specifically, turntable 300 has a mirror 1002 attached thereto for rotating mirror 1002 as depicted by the arrows, thereby sweeping laser beam 72 back and forth through a F-theta lens 904. The F-theta lens 904 focuses the laser beam and maintains the focal point of the laser in a plane as it translates to maintain the desired co-planarity. FIG. 11 shows another apparatus 1100 that is similar to apparatus 1000 since the workpiece is stationary and the laser beam moves for cutting the plurality of optical fibers of multifiber ferrule assembly 20. However, apparatus 1100 uses a linear air bearing 1004 for moving mirror 1002, thereby sweeping laser beam 72 back and forth through a F-theta lens 904. Other suitable configurations are possible for sweeping the laser beam so long as the desired repeatability and tolerances are maintained.

Figure 12:
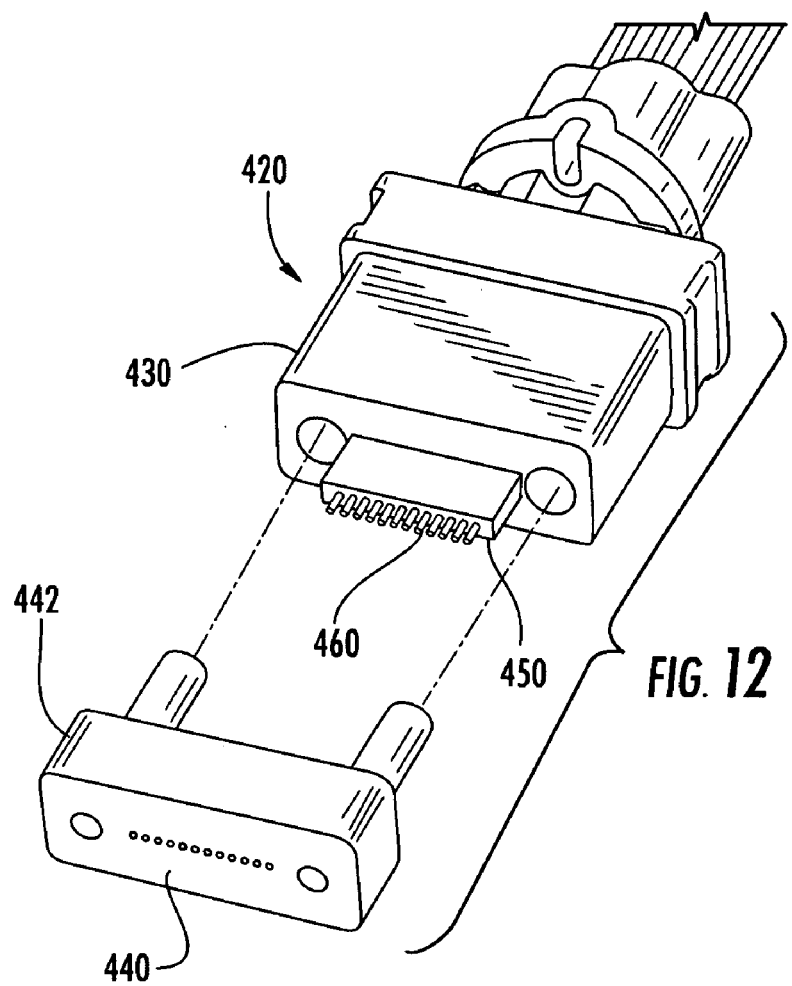
FIG. 12 is an exploded perspective view of another multifiber ferrule assembly in accordance with further aspects of the present invention.
Figure 13:
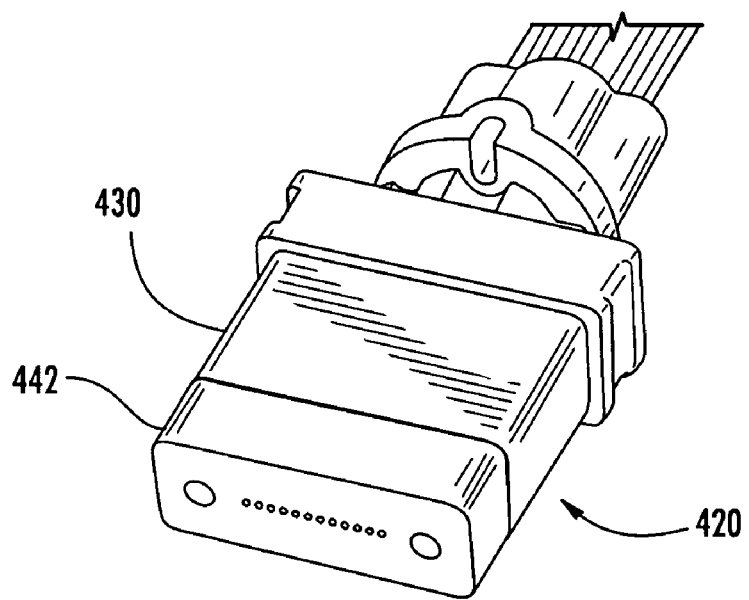
FIG. 13 is an assembled perspective view of the multifiber ferrule assembly of FIG. 12.

Additionally, the concepts disclosed herein may be practice with other suitable ferrules where the optical fibers extend a suitable distance from the front face so that the laser beam does not mark and/or damage the same. For instance, FIGS. 12 and 13 illustrate another example of a multifiber ferrule assembly 420. The multifiber ferrule assembly 420 includes an offset structure 442 including a first front surface 440 and a finished multifiber ferrule 430 with a second front surface 450 with a plurality of fiber bore openings including a plurality of optical fibers 460 extending from a respective one of the optical fiber bore openings. Simply stated, instead of using a backdraft the ferrule has an offset structure that is a removable portion from the portion that has the optical fibers attached thereto (i.e., the finished multifiber ferrule) for inhibiting interaction between the laser beam during cutting and polishing and then attached afterwards. A method of manufacturing the multifiber ferrule assembly is similar to the method described above and includes the steps of providing the offset structure 442 and the finished multifiber ferrule 430 and fixing the plurality of optical fibers 460 to the finished multifiber ferrule 430, wherein the plurality of optical fibers 460 extend from a respective one of the optical fiber bore openings to a position beyond the second front surface 450. Thereafter, cutting and polishing the plurality of optical fibers with a laser beam provides the optical fibers with a final polished end surface located beyond the second front surface 450. As shown in FIG. 13, the offset structure 442 is attached to the finished multifiber ferrule 430 after the step of cutting and polishing. In this embodiment, protrusions (not numbered) extending from the backside of offset structure 442 fit into bores (not numbered) of finished multifiber ferrule 430. Moreover, protrusions are suitable for receiving guide pins from the front side, thereby allowing alignment and mating with a complementary fiber optic connector. As shown in FIG. 13, the final polished end surface of each optical fiber 460 is located beyond the first front surface 440 for presenting the optical fibers 460 with an effective fiber height for mating in an optical connection.

Of course, other offset structures are possible. Other offset structure could use a finished multifiber ferrule that excludes guide pin bores and fits within an offset structure that has the guide pin bores. For example, the finished multifiber ferrule has a generally planar construction that inserts into and attaches to a generally rectangular offset structure having a passageway for receiving the same. Conversely, the offset structure could merely attach to the finished multifiber ferrule about the optical fibers so that one or more guide pins bores are not located on the offset structure.

Figure 14:
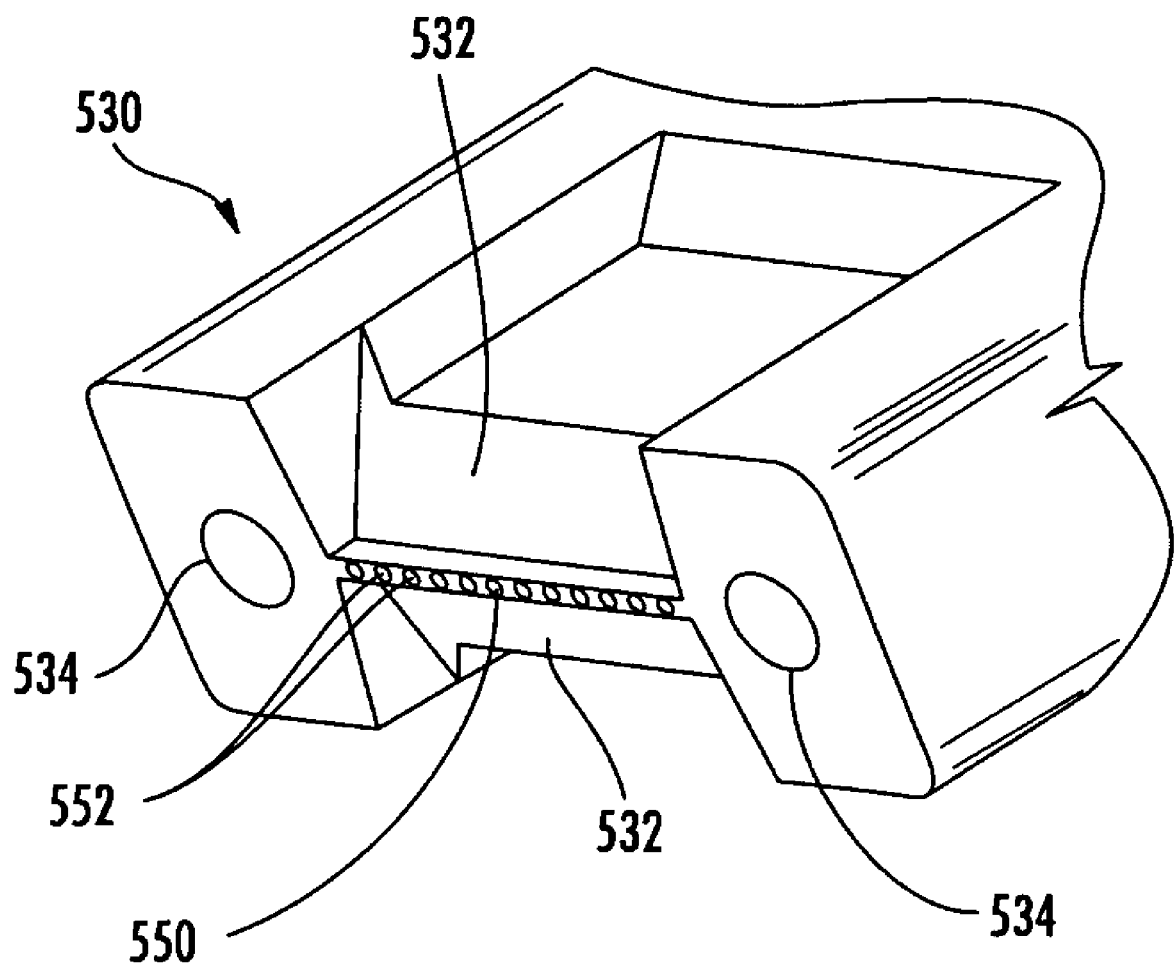
FIG. 14 is a perspective view of still another multifiber ferrule assembly.

Additionally, other finished multifiber ferrules can have other suitable configurations such as including a plurality of backdraft portions. Illustratively, FIG. 14 depicts a multifiber ferrule 530 having a plurality of backdraft portions 532. In this embodiment, the first surfaces (not numbered) of the front end having guide pin bores 534 are, generally speaking, co-planar with a second surface 550 having the openings for optical fiber bores 552. Thus, the laser beam can cut from either side of finished multifiber ferrule 530. In other embodiments, second surface 550 need not be co-planar with the first surface as shown. Simply stated, suitable multifiber ferrule assemblies provide optical fibers that extend a suitable distance from the ferrule where the optical fiber bores are located (e.g., the second front surface having the openings for the optical fiber bores) to inhibit interaction with the front of the ferrule during processing of the optical fibers that may cause marking and/or damage. Additionally, the multifiber ferrule assembly presents the processed fiber with an effective fiber height (i.e., short protrusion or the like) for mating with another complimentary fiber optic assembly Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for manufacturing a multifiber ferrule assembly comprising the steps of:
    processing an unfinished multifiber ferrule to provide a finished multifiber ferrule with a front end having a finished front end geometry including at least a first front surface and at least a second front surface, wherein the first front surface extends beyond the second front surface and the second front surface includes a plurality of optical fiber bore openings;
    fixing a plurality of optical fibers to the finished multifiber ferrule, wherein the plurality of optical fibers extend from a respective one of the optical fiber bore openings to a position beyond the first front surface; and
    processing the plurality of optical fibers fixed to the finished multifiber ferrule at a location beyond the first front surface to provide each optical fiber with a final polished end surface located beyond the first front surface without altering the finished front end geometry during the fiber processing step, wherein the first front surface of the finished front end geometry is configured to present each of the fibers with an effective fiber height for mating in an optical connection.

2. The method of claim 1, wherein the step of processing includes cutting and polishing the plurality of optical fibers with a laser beam.

3. The method of claim 2, wherein the front end further includes a backdraft portion and the laser beam cuts and polishes the plurality of optical fibers in a general direction from the second front surface toward the backdraft portion.

4. The method of claim 2, wherein the laser beam substantially avoids interaction with the finished multifiber ferrule during cutting and polishing of the plurality of optical fibers.

5. The method of claim 1, wherein the step of processing includes cutting and polishing the plurality of optical fibers with a laser beam that passes through a F-theta lens.

6. The method of claim 1, wherein step of processing includes cutting and polishing the plurality of optical fibers with a laser beam, wherein the laser beam moves back and forth relative to the finished multifiber ferrule during the step of cutting and polishing.

7. The method of claim 1, the step of processing further including maintaining a co-planarity of the plurality of optical fibers of about 500 nanometers or less.

8. The method of claim 1, the step of processing further including using an air bearing structure and a F-theta lens.

9. The multifiber ferrule assembly made according to the method of claim 1.

10. A method of manufacturing a multifiber ferrule assembly comprising the steps of:
    providing an offset structure including a front having a first front surface, a rear opposite the front and a plurality of optical fiber bore openings extending from the rear to the front;
    providing a finished multifiber ferrule separate from the offset structure with a front end including a second front surface with a plurality of optical fiber bore openings;
    fixing a plurality of optical fibers to the finished multifiber ferrule, wherein the plurality of optical fibers extend from a respective one of the optical fiber bore openings to a position beyond the second front surface;
    cutting and polishing the plurality of optical fibers with a laser beam to provide each optical fiber with a final polished end surface located beyond the second front surface; and
    mating the rear of the offset structure with the front of the finished multifiber ferrule after the step of cutting and polishing such that the first front surface of the offset structure is located beyond the second front surface of the multifiber ferrule and the plurality of optical fibers are received by the plurality of fiber optic bore openings of the offset structure, wherein the final polished end surface is located beyond the first front surface and the first front surface is configured to present each of the fibers with an effective fiber height for mating in an optical connection.

11. The method of claim 10, wherein a laser beam oscillates back and forth relative to the finished multifiber ferrule during the step of cutting and polishing.

12. The method of claim 10, wherein the step of cutting and polishing the plurality of optical fibers with a laser beam further including passing the laser beam through a F-theta lens.

13. The multifiber ferrule assembly made according to the method of claim 10.

14. A method for manufacturing a multifiber ferrule assembly comprising the steps of:
    providing a finished multifiber ferrule having a plurality of optical fiber bore openings and a front surface having a finished geometry;
    fixing a plurality of optical fibers to the finished multifiber ferrule, wherein the plurality of optical fibers extend from a respective one of the optical fiber bore openings to a position beyond the front surface; and
    moving a laser beam relative to the finished multifiber ferrule for cutting and polishing only the plurality of optical fibers at a location beyond the front surface to provide each optical fiber with an end surface located beyond the front surface without altering the finished geometry of the front surface of the finished multifiber ferrule while cutting and polishing the plurality of optical fibers.

15. The method of claim 14, wherein the step of moving a laser beam includes passing the laser beam through a F-theta lens.

16. The method of claim 14, wherein step of moving a laser beam is accomplished using an air bearing structure.

17. The method of claim 14, wherein step of moving a laser beam is accomplished using a minor that moves using an air bearing structure.

18. The method of claim 14, wherein the plurality of optical fibers has a co-planarity of about 500 nanometers or less.

* * * * *